United States Patent
Jousselin (10) Patent No.: US 9,528,387 B2
(45) Date of Patent: Dec. 27, 2016

(54) BLADE TIP TIMING

(71) Applicant: ROLLS-ROYCE PLC, London (GB)

(72) Inventor: Olivier Y J P Jousselin, Bristol (GB)

(73) Assignee: ROLLS-ROYCE plc, London (GB)

( * ) Notice: Subject to any disclaimer, the term of this patent is extended or adjusted under 35 U.S.C. 154(b) by 395 days.

(21) Appl. No.: 14/224,841

(22) Filed: Mar. 25, 2014

(65) Prior Publication Data

US 2014/0355007 A1     Dec. 4, 2014

(30) Foreign Application Priority Data

May 30, 2013   (GB) .................................. 1309622.7

(51) Int. Cl.
*F01D 21/00*       (2006.01)
*G01B 11/26*       (2006.01)

(52) U.S. Cl.
CPC ............. *F01D 21/003* (2013.01); *G01B 11/26* (2013.01); *F05D 2270/821* (2013.01)

(58) Field of Classification Search
None
See application file for complete search history.

(56) References Cited

U.S. PATENT DOCUMENTS 4,887,468 A    12/1989 McKendree et al.
5,511,426 A *   4/1996 Clement et al. ................ 73/655

(Continued)

FOREIGN PATENT DOCUMENTS

EP    2 136 189 A2    12/2009
EP    2 369 314 A1     9/2011
(Continued)

OTHER PUBLICATIONS

Oct. 2, 2014 Search Report issued in European Patent Application No. 14 16 1482.

(Continued)

*Primary Examiner* — Robert R Raevis
(74) *Attorney, Agent, or Firm* — Oliff PLC (57) ABSTRACT

A method of determining rotor blade axial displacement ($b_{ij}$). The rotor blade tip (34) comprises first and second measurement features (36, 38) arranged to make an acute angle therebetween. Measure time of arrival ($t_{ijk}$) of the once per revolution feature (1), first and second edges (40, 42) of the first measurement feature (36), and first and second edges (44, 46) of the second measurement feature (38), for at least two revolutions of the rotor (2). Convert these to circumferential distances ($d_{ijk}$) for each revolution. Calculate a feature angle ($\alpha_{ijk}$) between each measurement feature (36, 38) and the once per revolution feature (1) for each revolution. Calculate blade untwist angle ($\phi_{ij}$) from the change in feature angle ($\alpha_{ijk}$) between measured revolutions. Calculate the rotor blade axial displacement ($b_{ij}$) from the blade untwist angle ($\phi_{ij}$) and the circumferential distance ($d_{ijk}$) of the point from one of the measurement features (36, 38).

17 Claims, 4 Drawing Sheets

(56) References Cited

U.S. PATENT DOCUMENTS

| | | |
|---|---|---|
| 7,493,809 B1 | 2/2009 | Ward, Jr. |
| 2006/0171806 A1 | 8/2006 | Twerdochlib |
| 2008/0295604 A1 | 12/2008 | Hoyte et al. |
| 2010/0074727 A1* | 3/2010 | Twerdochlib ................. 415/118 |
| 2011/0211200 A1* | 9/2011 | Cribbs .......................... 356/614 |
| 2013/0321824 A1* | 12/2013 | Hockaday .................... 356/614 |

FOREIGN PATENT DOCUMENTS

| | | |
|---|---|---|
| EP | 2 574 734 A2 | 4/2013 |
| EP | 2 679 778 A1 | 1/2014 |

OTHER PUBLICATIONS

Search Report issued in British Application No. GB1309622.7 issued Jan. 10, 2014.

* cited by examiner

BLADE TIP TIMING

The present invention relates to a method of determining rotor blade axial displacement for a rotor blade mounted to a rotor, particularly where a rotor blade is prone to untwisting during rotation. It finds particular, though not exclusive, utility where the rotor is a gas turbine engine turbine rotor. The present invention also relates to a displacement system for performing the method.

A gas turbine engine turbine rotor, particularly for a high pressure turbine stage, comprises an array of rotor blades. The blade tips are generally short in the axial direction. This means that there is insufficient axial length on the surrounding casing or shroud segment to mount more than one blade tip timing probe. Furthermore, it is generally only possible to drill apertures in the centre of shroud segments to receive the timing probes due to stress and thermal factors.

Disadvantageously, for these reasons it has not been possible to determine the blade tip axial displacement corrected for blade untwist for a turbine stage.

A further disadvantage of known methods of determining rotor blade axial displacement is that they require multiple probes mounted around the rotor stage, which adds weight and complexity. Known methods are therefore best suited for testing and development environments and are generally not used for real-time measurement of blade tip timing data. This has the disadvantage that no real-time feedback about blade tip position can be supplied to systems monitoring and/or controlling the rotor stage.

The present invention provides a method of determining rotor blade axial displacement and a displacement system that seeks to address the aforementioned problems.

Accordingly the present invention provides a method of determining rotor blade axial displacement; the rotor blade mounted to a rotor having a once per revolution feature, the rotor rotating at a rotational speed; a radially outward tip of the rotor blade comprising a first measurement feature and a second measurement feature; the first and second measurement features arranged to make an acute angle therebetween; the measurement features and the once per revolution feature monitored by a stationary timing probe; the method comprising steps to:
 a) measure time of arrival of the once per revolution feature, first edge of the first measurement feature, second edge of the first measurement feature, first edge of the second measurement feature and second edge of the second measurement feature, for at least two revolutions of the rotor;
 b) multiply the difference between pairs of time of arrival measurements by the rotational speed and radial distance between the rotor axis and blade tip to calculate the circumferential distances for each measured revolution;
 c) calculate a feature angle between each measurement feature and the once per revolution feature for each measured revolution;
 d) calculate blade untwist angle from the change in feature angle between measured revolutions; and
 e) calculate the rotor blade axial displacement at a point from the blade untwist angle and the circumferential distance of the point from one of the measurement features.

Advantageously the method enables the axial displacement to be determined with a single axial probe location and so is suitable for use with rotor blades having short axial length at their tips. The method requires only two revolutions of data and so is quick. It is therefore suitable for use in real time monitoring of the rotor.

The rotor may comprise an array of rotor blades. The method may be repeated for each rotor blade comprised in the array. The method may be performed in parallel for at least two of the rotor blades comprised in the array. Advantageously this enables the method to be performed substantially in real time. The method may, therefore, be used for real time monitoring of the rotor.

The feature angle may be calculated from the circumferential distance of the measurement feature from the once per revolution feature and the spacing of the features. The spacing of the features is known.

The feature angle, blade untwist angle and blade axial displacement may each be calculated using trigonometry. Advantageously, such calculations are computationally quick and simple.

The point at which the blade axial displacement is calculated may be a midpoint between the first and second measurement features. Advantageously, this is an easily defined position. If necessary the axial displacement of any other point on the blade tip may be determined by its position relative to the point used in the method.

Each of the first measurement feature, second measurement feature and once per revolution feature may comprise a ridge, a groove or a line. Each of the first measurement feature, second measurement feature and once per revolution feature may be straight. The calculations are simplest when each feature is straight because the angle between any pair of the features is constant wherever it is measured. Alternatively each of the first measurement feature, second measurement feature and once per revolution feature may be curved with a known shape. Advantageously small axial displacements in a particular range can be magnified by having one or more of the features curved.

The features may be the same as each other or may be different. The first measurement feature and the second measurement feature may be the same as each other but different to the once per revolution feature. Beneficially the features may be clearly identifiable by the timing probe, for example to an optical timing probe. Beneficially the features have sufficient dimensions to be distinguishable from debris that accumulates on the blade tip during use of the rotor. In the case of the features comprising ridges or grooves, they protrude or recede radially by more than the expected height of accumulated debris.

With the rotor held static, the method may comprise steps before step a) to:
 a) measure the initial circumferential distance between pairs of the time of arrival measurement points;
 b) measure the perpendicular distance between the first edge and second edge of each measurement feature; and
 c) calculate the feature angle between each measurement feature and the once per revolution feature.

Advantageously, this provides a static case so that rotor blade axial displacement in the first revolution of the rotor may be determined using the method of the present invention.

The blade untwist angle for the first revolution may be calculated from the change of feature angle from the initial feature angle. Advantageously the initialisation period for the method is negligible.

The present invention also provides a computer program having instructions adapted to carry out the method described; a computer readable medium, having a computer program recorded thereon, wherein the computer program is adapted to make the computer execute the method described; and a computer program comprising the computer readable medium.

The present invention also provides a rotor blade configured for use in the method as described wherein the rotor blade comprises a blade tip; the blade tip comprising a first measurement feature and a second measurement feature; the first measurement feature and the second measurement feature arranged to make an acute angle therebetween. It is feasible to retrofit such measurement features to the tips of extant rotor blades. Advantageously the method of the present invention can then be used.

The present invention also comprises a displacement system comprising:
- a rotor having a once per revolution feature, the rotor rotates at a rotational speed;
- a rotor blade mounted to the rotor, the rotor blade comprising a first measurement feature, and a second measurement feature; the first and second measurement features arranged to make an acute angle therebetween;
- a stationary timing probe arranged to measure the time at which each feature passes the probe for each of at least two revolutions of the rotor; and
- a processor configured to perform the method as described.

Preferably all the parts of the displacement system may be commonly located, for example in a gas turbine engine. Advantageously, the method may then be performed in real time. Alternatively the processor may be located remotely to the rotor and probes. Advantageously, the method may then be performed for offline analysis of the displacement data.

The stationary timing probe may be optical.

The present invention also provides a gas turbine engine comprising the displacement system described. The rotor may comprise one of the group comprising: a compressor rotor; a fan; and a turbine rotor.

Any combination of the optional features is encompassed within the scope of the invention except where mutually exclusive.

The present invention will be more fully described by way of example with reference to the accompanying drawings, in which.

Figure 1:
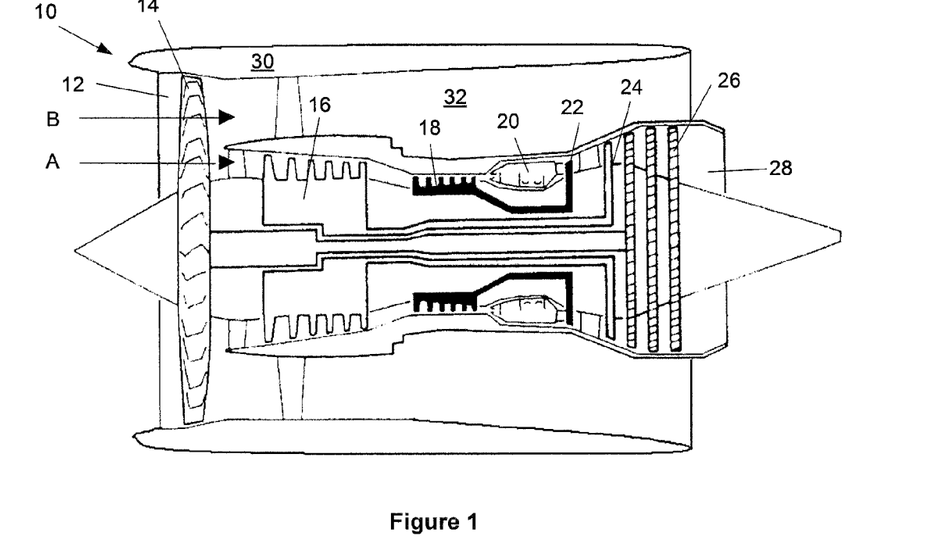
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 2:
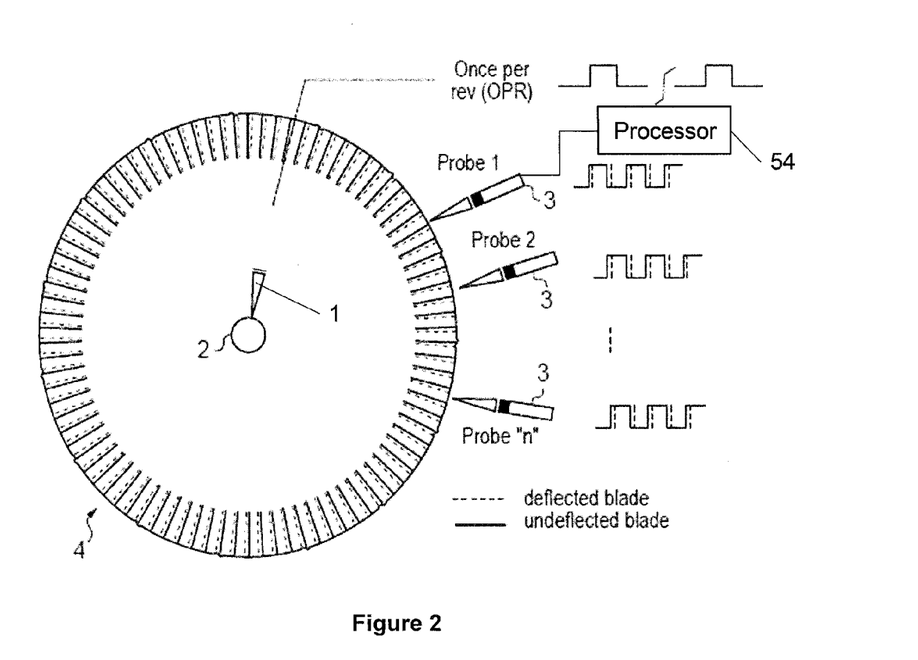
FIG. 2 is a schematic drawing of a blade tip timing arrangement.

FIG. 2 shows schematically a blade tip timing (BTT) arrangement. A once per revolution feature 1 is provided on the rotor 2. At least one BTT probe 3 is mounted to a casing (not shown) and provides time of arrival measurements of the blades 4 mounted to the rotor 2. For example, the rotor 2 and blades 4 arrangement may be one of the stages of the low pressure, intermediate pressure or high pressure turbine 22, 24, 26. It is particularly beneficial for shrouded turbine rotor stages where the axial space is constrained but there is adequate space on the radially facing surface of the blade tip for features that can be detected by the probes 3. The invention is also applicable to other rotor stages in a gas turbine engine 10 where the radially facing surface of the blade tip is of sufficient size to accommodate such detectable features. The probe 3 is coupled to a processor 54 and passes the time of arrival measurements thereto.

Figure 3:
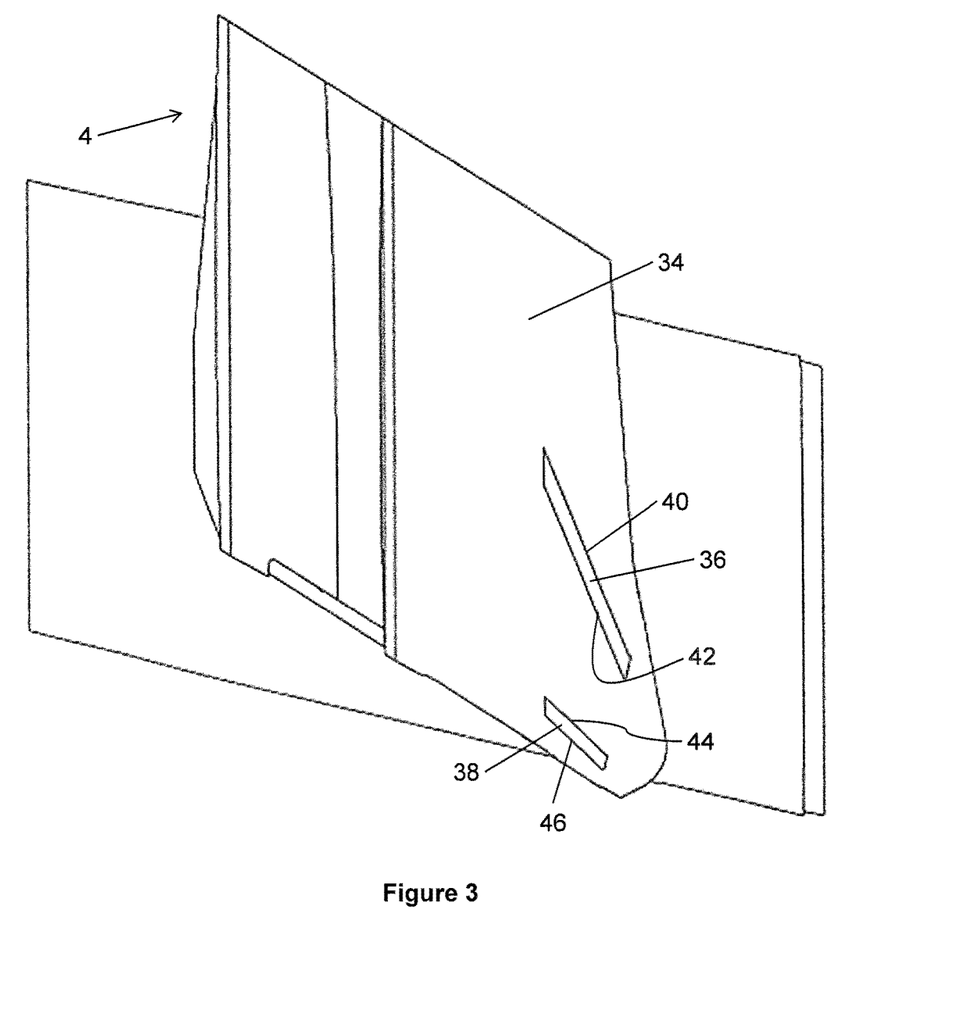
FIG. 3 is a radial end view of a turbine blade for use with the method according to the present invention.

FIG. 3 shows an exemplary turbine blade 4. The radially facing surface of the blade tip 34 is shrouded. It comprises a first measurement feature 36 and a second measurement feature 38. Each of the first and second measurement features 36, 38 is a flange which protrudes from the surface of the blade tip 34 and has a flat radial surface. The first measurement feature 36 has a first edge 40 and a second edge 42 which are parallel. The second measurement feature 38 has a first edge 44 and a second edge 46 which are parallel. The measurement features 36, 38 protrude sufficiently from the surface of the blade tip 34 that the stationary timing probe 3 mounted radially outwardly of the rotor blade 4 can distinguish between the measurement features 36, 38 and the surrounding blade tip surface 34. For example, the measurement features 36, 38 have sufficient radially depth that an optical signal sent by the probe 3 will take longer to be received by the probe 3 from the surface of the blade tip 34 than from the surface of one of the measurement features 36, 38.

The first measurement feature 36 is arranged to make an acute angle with a line parallel to the engine axis 9. For example, the first measurement feature 36 may make an angle of between 68° and 72°, preferably about 70° with a line parallel to the engine axis 9. The second measurement feature 38 is arranged to make an acute angle with the first measurement feature 36. For example, the angle between the first and second measurement features 36, 38 may be between 43° and 47°, preferably about 45°. Thus the first and second measurement features 36, 38 are non-parallel. Advantageously, this means that time of arrival measurements from a single probe 3 can be used to correct rotor blade axial displacement for blade untwist.

In a first step of the method of the present invention the time of arrival $t_{ijk}$, at the probe 3 of the edges 40, 42, 44, 46 of each of the measurement features 36, 38 of each of the blades 4 is measured for at least two revolutions of the rotor 2. The subscript i represents the blade number, the subscript j represents the revolution of the rotor 2 and the subscript k represents the measurement point number. The time of arrival $t_{ij0}$ of the once per revolution feature 1 is also measured for the same revolutions of the rotor 2.

Figure 4:
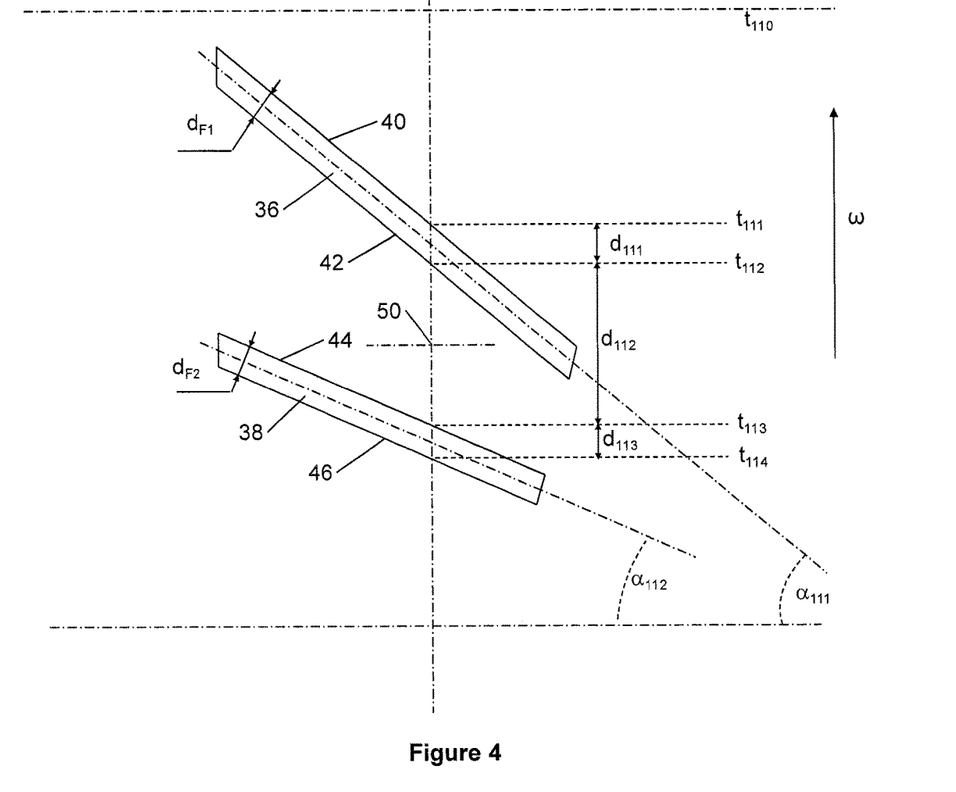
FIG. 4 is a schematic drawing of the measurement features and some of the calculation steps of the present invention.

FIG. 4 schematically shows the measurement features 36, 38 and calculation steps of the method. The line 48 represents the axial position of the probe 3. The midpoint 50 between the first and second measurement features 36, 38 is shown on the probe position line 48. The midpoint 50 is determined when the blade 4 is static (not rotating) so there is no untwist or axial displacement effect. The axial displacement $b_{ij}$ of the midpoint 50 is used as an analogue for the axial displacement $b_{ij}$ of the blade 4 since different parts of the blade 4 move different amounts axially.

The times of arrival $t_{ijk}$ of the edges 40, 42, 44, 46 of the measurement features 36, 38 are shown in FIG. 4 as is the time of arrival $t_{110}$ of the once per revolution feature 1. The circumferential distances $d_{ijk}$ between each pair of measurement points are also shown. These are calculated in a second step of the method by multiplying the difference between times of arrival $t_{ijk}$ by the rotational speed ω of the rotor 2, in radians/second, and by the radial distance between the rotor axis and the tip of the blade 4. These steps are repeated for the second revolution of the rotor 2. Hence the circumferential distance $d_{ijk}$ calculated between the second edge 42 of the first measurement feature 36 and the first edge 44 of the second measurement feature 38 on the second revolution of the rotor 2 is represented as $d_{122}$.

In an initialisation of the method, the rotor 2 is held static and the initial circumferential distances $d_{i0k}$ between pairs of the time of arrival measurement points are measured. Thus the initial circumferential distance $d_{i0k}$ between the first edge 40 and the second edge 42 of the first measurement feature 36 is represented as $d_{101}$. FIG. 4 also shows the perpendicular distance $d_{F1}$ between the first edge 40 and the second edge 42 of the first measurement feature 36, and the perpendicular distance $d_{F2}$ between the first edge 44 and the second edge 46 of the second measurement feature 38. The perpendicular distances $d_{F1}$, $d_{F2}$ are also measured in the initialisation.

In a final step of the initialisation of the method, the feature angles $\alpha_{i0k}$ between each measurement feature 36, 38 and the once per revolution feature 1 are calculated for the static case. The calculation is performed in the same way as for the rotating cases described below.

In a third step of the method of determining the rotor blade axial displacement $b_{ij}$ a feature angle $\alpha_{ijk}$ is determined between the first measurement feature 36 and the once per revolution feature 1, and a feature angle $\alpha_{ijk}$ is determined between the second measurement feature 38 and the once per revolution feature 1. Thus the feature angles $\alpha_{ijk}$ for the first blade 4 on the first and second revolutions of the rotor 2 are represented as $\alpha_{111}$, $\alpha_{121}$, $\alpha_{112}$ and $\alpha_{122}$. The feature angles $\alpha_{ijk}$ can be determined using trigonometric calculations. The feature angle $\alpha_{ij1}$ of the first measurement feature 36 is the inverse cosine of its perpendicular distance $d_{F1}$ divided by the circumferential distance $d_{ij1}$ between its edges 40, 42. Similarly, the feature angle $\alpha_{ij2}$ of the second measurement feature 38 is the inverse cosine of its perpendicular distance $d_{F2}$ divided by the circumferential distance $d_{ij3}$ between its edges 44, 46.

Figure 5:
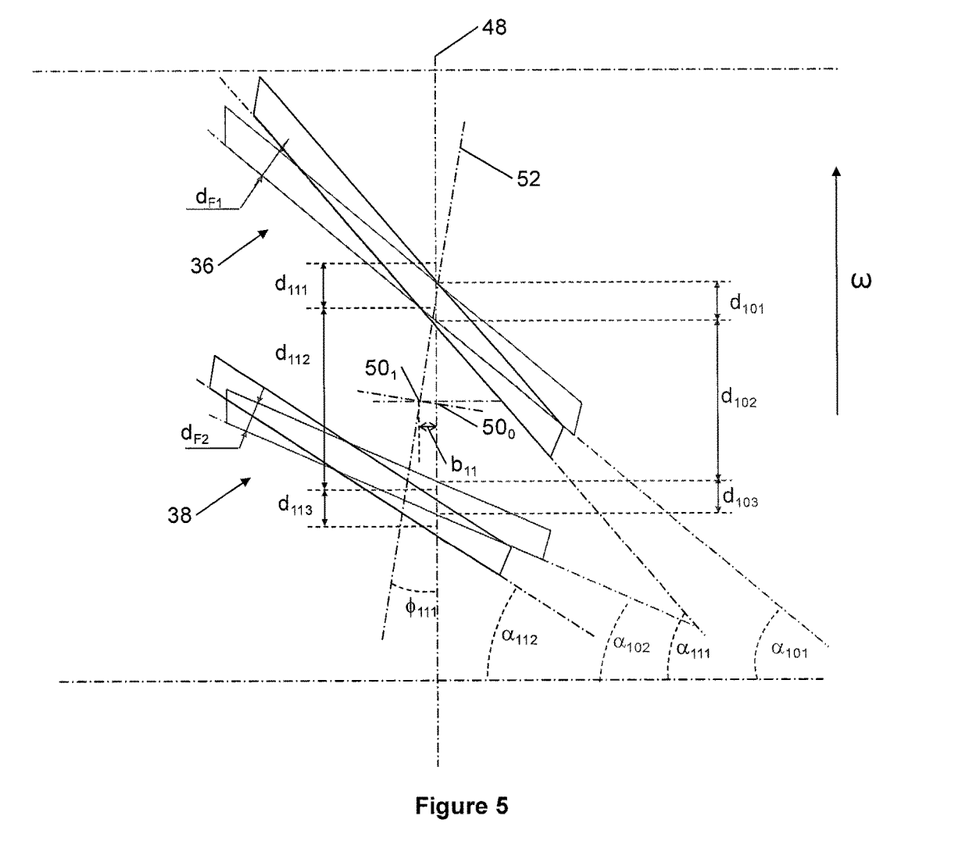
FIG. 5 is also a schematic drawing of the measurement features and some of the calculation steps of the present invention.

FIG. 5 is similar to FIG. 4 but shows the static case, revolution j=0 where the rotor 2 is not rotating, with the first revolution j=1 superimposed on it. Thus the position of the static midpoint is labelled $50_0$ and the first revolution position of the midpoint is labelled $50_1$. The blade untwist angle $\phi_{ijk}$ is the angle made between the probe position line 48 and the effective probe position line 52, which connects the measured timing points for the first revolution case. The blade untwist angle $\phi_{ijk}$ is the change in the feature angle $\alpha_{ijk}$ between measured revolutions of the rotor 2 for one of the measurement features 36, 38. For the first revolution, it is the change of the feature angle $\alpha_{i1k}$ from the initial feature angle $\alpha_{i0k}$. Mathematically, that is $\phi_{111}=\alpha_{111}-\alpha_{101}=\alpha_{112}-\alpha_{102}$. The feature angles $\alpha_{ijk}$ are calculated at the fourth step of the method.

The final step of the method comprises calculating the rotor blade axial displacement $b_{ij}$. Since the axial displacement $b_{ij}$ of each point on the blade tip 34 is different, the midpoint 50 is generally used as the exemplary point for which axial displacement $b_{ij}$ is stated. However, any suitable point on the blade tip 34 may be used. The rotor blade axial displacement $b_{ij}$ of the point, for example midpoint 50, is calculated from the blade untwist angle $\phi_{ijk}$ and the circumferential distance $d_{ijk}$ of the point from one of the measurement features 36, 38. Mathematically, the rotor blade axial displacement $b_{ij}$ for the first blade 4 (i=1) and the first revolution (j=1), thus relative to the static case (j=0), is:

$$b_{11} = \left(\frac{d_{112}\cos(\alpha_{12})}{\cos(\alpha_{102})}\right) * \left(\frac{2}{\tan(\alpha_{112})\cos(\alpha_{102})d_{112}} - \tan(\alpha_{112})\right) + d_{102} * \left(\frac{\tan(\alpha_{112})}{2} - \frac{1}{\tan(\alpha_{111}-\alpha_{112})}\right)$$

More generally, the rotor blade axial displacement $b_{ij}$ for the $i^{th}$ blade 4 and the $j^{th}$ revolution relative to the $(j-1)^{th}$ revolution is:

$$bij = \left(\frac{d_{ijk}\cos(\alpha_{ijk})}{\cos(\alpha_{i(j-1)k})}\right) * \left(\frac{2}{\tan(\alpha_{ijk})\cos(\alpha_{i(j-1)k})d_{ijk}} - \tan(\alpha_{ijk})\right) + d_{i(j-1)k} * \left(\frac{\tan(\alpha_{ijk})}{2} - \frac{1}{\tan(\alpha_{ij1}-\alpha_{ijk})}\right).$$

Advantageously the rotor blade axial displacement $b_{ij}$ determined according to the method of the present invention is corrected for the blade untwist effect. Thus the true axial displacement $b_{ij}$ is calculated. The rotor blade axial displacement $b_{ij}$ can be used in a feedback control loop as a more accurate value of the rotor blade stagger angle. Beneficially the method of the present invention requires minimal processing capacity because it uses only time of arrival measurements $t_{ijk}$ for the calculations.

The method of determining the rotor blade axial displacement $b_{ij}$ has application for health monitoring of the rotor blades 4 and for control of the rotor 2. For example, the rotor blade axial displacement $b_{ij}$ may be used in the detection and/or control of surge, stall and blade flutter events.

The method has been described with respect to one rotor blade 4 of the array of rotor blades 4 mounted to the rotor 2. Preferably the method is repeated for each rotor blade 4. The determination of the rotor blade axial displacement $b_{ij}$ can be substantially in parallel for two or more of the rotor blades 4 forming the array.

Instead of resembling flanges, the first and second measurement features 36, 38 may each be a ridge, a groove or a distinguishable line drawn on the radial surface of the blade tip 34. Preferably the measurement features 36, 38 are optically recognisable and the timing probe 3 is an optical probe. Preferably the first and second measurement features 36, 38 have the same form and the measurement features 36, 38 on each blade tip 34 are the same. Alternatively the first and second measurement features 36, 38 may have different form or the measurement features 36, 38 on one blade tip 34 may have different form from the measurement features 36, 38 on another blade tip 34 of the same array.

The simplest form of the first measurement feature 36, second measurement feature 38 and once per revolution feature 1 is straight. Alternatively one or more of these features 36, 38, 1 may be curved in a known shape, such as a segment of a circle, ellipse or conic section. The features 36, 38, 1 may form parabolic, quadratic, higher order polynomial, or exponential curves or may form a curve governed by a complex equation.

The method of the present invention is preferably encompassed in computer-implemented code and stored on a computer-readable medium. It is thus a computer-implemented method of determining rotor blade axial displacement $b_{ij}$. The method may be implemented on a basic computer system comprising a processing unit, memory, user interface means such as a keyboard and/or mouse, and display means. The method may be performed 'offline' on data which has been measured and recorded previously. Alternatively it may be performed in 'real-time', that is at the same time that the data is measured. In this case the computer may be coupled to the rotor 2. Where the rotor 2 forms part of a gas turbine engine 10 the computer may be an electronic engine controller or another on-board processor. Where the gas turbine engine 10 powers an aircraft, the computer may be an engine controller, a processor on-board the engine 10 or a processor on-board the aircraft.

Preferably the method of the present invention is repeated for each blade 4 in the array of blades 4 that form the rotor 2. Preferably the method is performed in parallel for at least two of the blades 4 in the array. Where the processor 54 on which the method is performed is a computer this is a simple matter. For example, the time of arrival measurements for each of the blades 4 forming the array of blades 4 at the probe 3 can be recorded in a multi-dimensional matrix. The necessary data can then be extracted by the processor 54 to perform the method for each blade 4. Alternatively the method may be performed in series for at least two of the blades 4 in the array.

Although the method steps have been described in a particular order, some of the steps may be performed in a different order.

The present invention also provides a blade tip displacement system comprising the rotor 2 having the array of blades 4 that rotate at a rotational speed. The system includes the probe 3, which may be one of an array of probes 3 that may be equally or irregularly spaced circumferentially around part or the whole circumference of a rotor casing. The probes 3 are arranged to measure the arrival time $t_{ijk}$ of each blade tip for at least two consecutive revolutions of the rotor 2 and pass the measurements to a processor 54. The processor 54 is configured to perform the method of the present invention. Using time of arrival measurements $t_{ijk}$ from multiple probes 3 can beneficially correct for outliers by calculating a mean value.

The method of the present invention requires time of arrival data $t_{ijk}$ for at least two revolutions of the rotor 2. Preferably the revolutions are consecutive. However, in some embodiments or applications it may be beneficial to use non-consecutive revolutions, such as alternate revolutions. The method may use time of arrival data $t_{ijk}$ from more than two revolutions of the rotor 2. Advantageously this reduces the noise to signal ratio. However, it is necessary to ensure that the rotational speed $\omega$ of the rotor 2 is substantially unchanged through all the revolutions of the rotor 2 since this is used to derive the circumferential distances $d_{ijk}$.

The method of the present invention is preferably applied to obtain the rotor blade axial displacements $b_{ij}$ for each successive revolution of the rotor 2. Thus where time of arrival data $t_{ijk}$ from two revolutions are used, data from the first and second revolutions are processed by the method to provide the rotor blade axial displacement $b_{ij}$ for the first revolution. Then time of arrival data $t_{ijk}$ from the second and third revolutions are used to provide the rotor blade axial displacements $b_{ij}$ for the second revolution. As will be apparent, the time of arrival data $t_{ijk}$ from the second revolution is used in application of the method to provide the rotor blade axial displacements $b_{ij}$ for both the first and second revolutions.

Advantageously the method can be used to determine the rotor blade axial displacements $b_{ij}$ in substantially real time; that is, as the time of arrival measurements $t_{ijk}$ are taken they can be processed to produce the rotor blade axial displacements $b_{ij}$ as soon as at least two revolutions worth of measurements are available. Thus the method has particular utility in real time analysis applications such as engine health monitoring and control systems for a gas turbine engine 10.

The measurement features 36, 38 may comprise optical recognisable features such as notches, grooves, protrusions or coloured lines on the tip of the rotor blade 4. The once per revolution feature 1 may similarly comprise an optically recognisable feature such as a notch, groove, protrusion or coloured line on the rotor 2.

The method of the present invention can be applied to blade tip timing measurements howsoever obtained. The measurements may be obtained in development or during operational running. Thus it has applications in any bladed rotor in a gas turbine engine 10 for aerospace, marine or industrial use, such as fan blades, compressor stages and turbine stages. It also has potential application for wind and tidal turbines, turbochargers, motors and any other rotors that comprise blades, particularly those that are prone to untwist in use, from which time of arrival measurements can be taken.

The invention claimed is:

1. A method of determining rotor blade axial displacement ($b_{ij}$); the rotor blade mounted to a rotor having a once per revolution feature, the rotor rotating at a rotational speed ($\omega$) about an axis; a radially outward tip of the rotor blade comprising a first measurement feature and a second measurement feature; the first and second measurement features arranged to make an acute angle ($\alpha_{ijk}$) therebetween; the measurement features and the once per revolution feature monitored by a stationary timing probe; the method comprising steps to:

a) measure time of arrival ($t_{ijk}$) of the once per revolution feature, first edge of the first measurement feature, second edge of the first measurement feature, first edge of the second measurement feature and second edge of the second measurement feature, for at least two revolutions of the rotor;

b) multiply the difference between pairs of time of arrival measurements ($t_{ijk}$) by the rotational speed ($\omega$) and radial distance between the rotor axis and blade tip to calculate the circumferential distances ($d_{ijk}$) for each measured revolution;

c) calculate a feature angle ($\alpha_{ijk}$) between each measurement feature and the once per revolution feature for each measured revolution;

d) calculate blade untwist angle ($\phi_{ij}$) from the change in feature angle ($\alpha_{ijk}$) between measured revolutions; and e) calculate the rotor blade axial displacement ($b_{ij}$) at a point from the blade untwist angle ($\phi_{ij}$) and the circumferential distance ($d_{ijk}$) of the point from one of the measurement features.

2. The method as claimed in claim 1 wherein the rotor comprises an array of rotor blades, and the method is repeated for each rotor blade comprised in the array.

3. The method as claimed in claim 2 wherein the method is performed in parallel for at least two of the rotor blades comprised in the array.

4. The method as claimed in claim 1 wherein the feature angle ($\alpha_{ijk}$) is calculated from the circumferential distance ($d_{ijk}$) of the measurement feature from the once per revolution feature and the spacing of the features.

5. The method as claimed in claim 1 wherein the feature angle ($\alpha_{ijk}$), blade untwist angle ($\phi_{ij}$) and blade axial displacement ($b_{ij}$) are calculated using trigonometry.

6. The method as claimed in claim 1 wherein the point is a midpoint between the first measurement feature and the second measurement feature.

7. The method as claimed in claim 1 wherein each of the first measurement feature, second measurement feature and once per revolution feature comprise a ridge; a groove; or a line.

8. The method as claimed in claim 1 wherein each of the first measurement feature, second measurement feature and once per revolution feature is straight, or curved with known shape.

9. The method as claimed in claim 1, with the rotor held static, comprising steps before step 1a) to:
  a) measure the initial circumferential distance ($d_{iOk}$) between pairs of the time of arrival measurement points;
  b) measure the perpendicular distance between the first edge and second edge of each measurement feature; and
  c) calculate the feature angle ($\alpha_{iOk}$) between each measurement feature and the once per revolution feature.

10. The method as claimed in claim 9 wherein the blade untwist angle for the first revolution ($\phi_{i1}$) is calculated from the change of feature angle ($\alpha_{ijk}$) from the initial feature angle ($\alpha_{iOk}$).

11. A computer program having instructions adapted to carry out the method according to claim 1.

12. A computer readable medium, having a computer program recorded thereon, wherein the computer program is adapted to make the computer execute the method according to claim 1.

13. The computer program comprising the computer readable medium as claimed in claim 12.

14. A displacement system comprising:
  a rotor having a once per revolution feature, the rotor rotates at a rotational speed ($\omega$) about an axis;
  a rotor blade mounted to the rotor, the rotor blade comprising a first measurement feature, and a second measurement feature; the first and second measurement features arranged to make an acute angle ($\alpha_{ijk}$) therebetween;
  a stationary timing probe arranged to measure the time ($t_{ijk}$) at which each feature passes the probe for each of at least two revolutions of the rotor; and
  a processor configured to perform the method as claimed in claim 1.

15. The system as claimed in claim 14 wherein the stationary timing probe is optical.

16. A gas turbine engine comprising the displacement system as claimed in claim 14.

17. The gas turbine engine as claimed in claim 16 wherein the rotor comprises a compressor rotor; a fan; or a turbine rotor.

* * * * *